(12) United States Patent
Dai et al.

(10) Patent No.: US 10,296,374 B2
(45) Date of Patent: May 21, 2019

(54) MIGRATION OF VIRTUAL MACHINES

(71) Applicant: Hewlett Packard Enterprise Development LP, Houston, TX (US)

(72) Inventors: Xinchun Dai, Beijing (CN); Yinfei Zhang, Beijing (CN); Tao Lin, Beijing (CN); Weichun Ren, Beijing (CN); Tao Wen, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 55 days.

(21) Appl. No.: 15/511,433

(22) PCT Filed: Sep. 18, 2015

(86) PCT No.: PCT/CN2015/089946
§ 371 (c)(1),
(2) Date: Mar. 15, 2017

(87) PCT Pub. No.: WO2016/041521
PCT Pub. Date: Mar. 24, 2016

(65) Prior Publication Data
US 2017/0286158 A1    Oct. 5, 2017

(30) Foreign Application Priority Data

Sep. 19, 2014  (CN) .......................... 2014 1 0482536

(51) Int. Cl.
*G06F 9/48* (2006.01)
*G06F 9/50* (2006.01)
(Continued)

(52) U.S. Cl.
CPC ........ *G06F 9/4856* (2013.01); *G06F 9/45558* (2013.01); *H04L 12/4633* (2013.01);
(Continued)

(58) Field of Classification Search
CPC .................................................. H04J 14/0269
See application file for complete search history.

(56) References Cited

U.S. PATENT DOCUMENTS

2011/0131289 A1    6/2011  Kim
2012/0307826 A1*  12/2012  Matsuoka ............... H04L 49/70
                                         370/390

(Continued)

FOREIGN PATENT DOCUMENTS

CN    102316001 A    1/2012
CN    102457583      5/2012
(Continued)

OTHER PUBLICATIONS

International Search Report and Written Opinion dated Nov. 30, 2015, PCT Patent Application No. PCT/CN2015/089946 dated Sep. 18, 2015, State Intellectual Property Office of the P.R. China.

(Continued)

*Primary Examiner* — Brandon M Renner
*Assistant Examiner* — The Hy Nguyen
(74) *Attorney, Agent, or Firm* — Sheppard Mullin Richter & Hampton

(57) ABSTRACT

Examples of the present disclosure provide a method of migrating a virtual machine. In response to receiving information of a newly added port, a first controller within a software defined network may search for a matching destination Internet protocol address within a first neighbor relationship table when an IP address contained in the information of the newly added port is taken as a source IP address. The first controller may send flow tables relating to the matching destination IP address to a destination virtual switching device of a migrated virtual machine, and update flow tables stored in virtual switching devices managed by the first controller. The first controller may send a migration success message including the information of the newly (Continued)

added port to a second controller, to enable the second controller to update flow tables stored in virtual switching devices managed by the second controller.

15 Claims, 6 Drawing Sheets

(51) Int. Cl.
    *G06F 9/455* (2018.01)
    *H04L 12/46* (2006.01)
    *H04L 29/08* (2006.01)
(52) U.S. Cl.
    CPC ........ *H04L 67/2814* (2013.01); *G06F 9/5088* (2013.01); *G06F 2009/4557* (2013.01); *H04L 67/10* (2013.01)

(56) References Cited

U.S. PATENT DOCUMENTS

| | | | | |
|---|---|---|---|---|
| 2013/0148654 A1* | 6/2013 | Sayani | ................... | H04L 49/70 370/389 |
| 2015/0149611 A1* | 5/2015 | Lissack | ............... | H04L 43/0817 709/224 |
| 2015/0222543 A1* | 8/2015 | Song | ................... | H04L 12/4641 370/392 |
| 2015/0281067 A1* | 10/2015 | Wu | ....................... | H04L 61/103 370/392 |
| 2015/0309818 A1* | 10/2015 | Lee | ..................... | G06F 9/45533 718/1 |
| 2016/0234059 A1* | 8/2016 | Gu | ....................... | H04L 41/0668 |
| 2016/0269287 A1* | 9/2016 | Li | ....................... | H04L 49/3009 |
| 2017/0118171 A1* | 4/2017 | Wu | ....................... | H04L 61/103 |

FOREIGN PATENT DOCUMENTS

| | | |
|---|---|---|
| CN | 103905303 | 7/2014 |
| EP | 2562973 A1 | 2/2013 |
| WO | WO-2013064951 | 5/2013 |

OTHER PUBLICATIONS

Unknown, "OpenFlow Switch Specification", Version 1.0.0 (Wire Protocol 0x01), Dec. 31, 2009, 42 pages.

* cited by examiner

MIGRATION OF VIRTUAL MACHINES

BACKGROUND

Software defined network (SDN) technology may provide a framework for network communications, and realize centralized control and distributed forwarding for network devices. As to the SDN technology, its network functionality may be divided into two parts, i.e., controllers and datapaths, which may interact with each other via a secure channel. The controller may offer a central management for the network devices (such as virtual machines) under its control, and regulate the forwarding of the datapaths.

There are various different types of implementation for the SDN technology, and OpenFlow technology is an example of them. The OpenFlow technology may expand the packet forwarding based on Media Access Control (MAC) and the route forwarding based on Internet Protocol (IP) to the flow forwarding described by multiple fields of a packet header. In the meantime, the OpenFlow technology may decouple a control plane from forwarding devices, and transfer a role of decision making for forwarding from a forwarding device (such as a switch) to a centralized controller.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples.

In the SDN technology, a controller may transmit a flow table to a virtual switching device for instructing flow forwarding. If the controller may also store another copy of the flow table having been transmitted to the virtual switching device on its own for controlling migration of virtual machines, a large portion of storage resources of the controller may be occupied by the flow tables already been transmitted to the virtual switching device since a flow table may always include a large amount of data.

In an example, the flow table may be responsible for performing packet lookup and forwarding. The flow table may include a set of flow entries, wherein each flow entry may include components such as header fields, counters, and actions. If a flow entry is found for an incoming packet, the actions for that flow entry may be performed on the incoming packet. In an example, the actions might be to forward a packet out a specified port. If no match is found, the incoming packet may be forwarded to the controller over a secure channel. The controller may be responsible for determining how to handle packets without valid flow entries, and it may manage the flow table by adding and removing flow entries.

Figure 1:
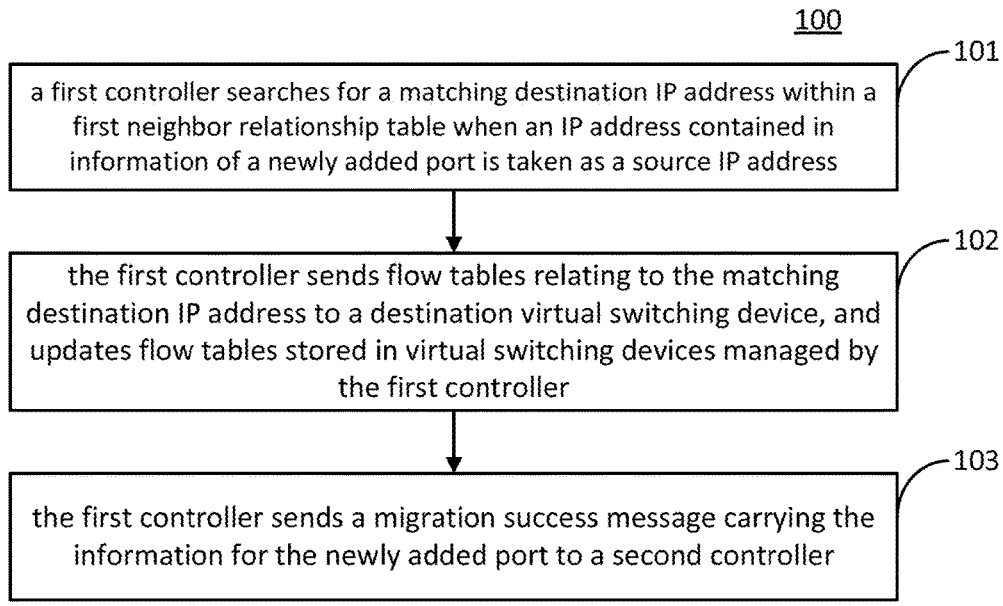
FIG. 1 is a flow chart illustrating a method 100 of migrating virtual machines in accordance with an example of the present disclosure.

FIG. 1 is a flow chart illustrating a method of migrating a virtual machine 100 in accordance with an example of the present disclosure. In the example, the controller may manage flow tables according to neighbor relationship of virtual machines (VMs).

The migration of the virtual machine may refer to a process of moving the virtual machine from one host or storage position to another. In an example, the host on which the migrated virtual machine resides before the migration may be referred to as a source host. A virtual switching device providing flow control and forwarding for the migrated virtual machine before the migration may be referred to as a source virtual switching device. Accordingly, the host on which the virtual machine resides after the migration has been completed, may be referred to as a destination host. A virtual switching device providing flow control and forwarding for the migrated virtual machine after the migration has been completed, may be referred to as a destination virtual switching device.

At block 101, a first controller in a software defined network may receive information relating to a newly added port generated for a migrated virtual machine, and search for a matching destination IP address within a first neighbor relationship table which corresponds to an IP address contained in the information of the newly added port.

In an example, the information of the newly added port may include parameters for identifying a port newly added into the network. The first neighbor relationship table may record corresponding relationships between source IP addresses and destination IP addresses of packets forwarded via virtual switching devices managed by controllers within the SDN. In an example, the first controller may be responsible for controlling the destination virtual switching device of the migrated virtual machine, and can also manage other virtual switching devices besides the destination virtual switching device.

In an example, the searching at block 101 may be performed by using the IP address contained in the information of the newly added port as a source IP address, finding a first neighbor relationship item including the source IP address from the first neighbor relationship table, and taking a destination IP address recorded in the first neighbor relationship item as the matching destination IP address. In an example, "matching" may refer to fulfilling a specified relationship.

At block 102, the first controller may send flow tables relating to the matching destination IP address to the destination virtual switching device, and update flow tables stored in virtual switching devices managed by the first controller.

In an example, the first neighbor relationship table may record corresponding relationships among source IP addresses, source MAC addresses, and destination IP addresses of packets forwarded via virtual switching devices managed by controllers within the SDN. Accordingly, the process of sending the flow tables relating to the matching destination IP address to the destination virtual switching device at block 102 may be implemented as follows. The first controller may take an IP address contained in the information of the newly added port as the source IP address, and take a MAC address contained in the information of the newly added port as a source MAC address, thereby finding the matching destination IP address having a corresponding relationship with the IP address and MAC address contained in the information of the newly added port within the first neighbor relationship table. The first controller may generate the flow tables relating to the matching destination IP address, and send the flow tables to the destination virtual switching device. In this way, the destination virtual switching device may correctly deliver packets to the matching destination IP address for the migrated VM.

In an example, the process of updating the flow tables stored in virtual switching devices managed by the first controller at block 102 may be implemented as follows. The first controller may obtain a subnet identifier from a global port table according to the IP address and the MAC address contained in the information of the newly added port. The first controller may then use both the IP address contained in the information of the newly added port as the destination IP address and the subnet identifier obtained to find a matching source IP address from a second neighbor relationship table. Thereafter, the first controller may generate flow tables relating to the matching source IP address for the virtual switching devices managed by the first controller, to enable that packets to be sent to the migrated VM can be received by the migrated VM correctly. In an example, the virtual switching devices managed by the first controller may refer to all virtual switching devices managed by the first controller, which have communicated with the migrated VM. In some cases, there may be one virtual switching device within the management of the first controller that has communicated with the migrated VM, which needs updating of flow tables. More generally, since the first controller may manage a plurality of virtual switching devices, there may be multiple virtual switching devices in need of flow table updating. In an example, the global port table may record information of ports for uniquely identifying the ports within the SDN.

At block 103, the first controller may send a migration success message carrying the information of the newly added port to a second controller, to enable the second controller to update flow tables stored in virtual switching devices managed by the second controller. In an example, the second controller may be other controllers within the SDN, which is different from the first controller.

In an example, the process of the second controller updating the flow tables stored in the virtual switching devices managed by the second controller at block 103 may be similar to the process of the first controller updating the flow tables stored in the virtual switching devices managed by the first controller described at block 102. Also, the virtual switching devices managed by the second controller may refer to all virtual switching devices managed by the second controller, which have communicated with the migrated VM.

According to the method 100 described in FIG. 1, a controller may not store flow tables for controlling migration of virtual machines. Instead, the controller may generate and record neighbor relationship tables for virtual machines. For example, the controller may not store another copy of flow tables relating to a source host on its own. When a virtual machine is migrated, the controller may generate the flow tables relating to the source host according to the neighbor relationship tables, and provide the flow tables relating to the source host to a destination host. As such, a waste of resources of the controller may be avoided.

The method 100 depicted in FIG. 1 may be adopted in such as a SDN. In an example, the SDN may include virtual switching devices and controllers. The virtual switching device may be a forwarding device, such as a switch, for managing network connections of virtual machines connecting with it via network ports, and forwarding packets for the virtual machines. In an example, the virtual switching device may be a virtual forwarding engine (VFE), which may implement flow forwarding and control for the network ports. A host in the SDN may include multiple virtual machines, and a VFE for connecting the virtual machines to the network. In another example, the host may include multiple VFEs, each of which controls a plurality of virtual machines. In an example, the hosts may communicate with each other via a tunnel, and an overlay protocol such as a Virtual eXtensible Local Area Network (VXLAN) protocol may be adopted for establishing the tunnel. In another example, the hosts may communicate via another way without using a tunnel, and a Virtual Local Area Network (VLAN) protocol may be employed for the communication. Then, a tunnel IP address may be omitted from such as the information for the newly added port and the global port table.

In an example, the controller may be a virtual control engine (VCE), which may realize central management and configuration for the VFEs. The VCE may be a physical device, or a virtual device deployed on a physical device. In an example, a VCE may be configured as a primary VCE, which has its backup VCE. A backup VCE may synchronize information with that stored in its primary VCE. Also, a VCE may be configured as a primary VCE of a first host, and also be configured as a backup VCE of a second host. Examples of the present disclosure describe operations of the primary VCE, while the operations of the backup VCE may refer to those of the primary VCE and not be disclosed repeatedly.

In an example, a controller may configure multiple virtual distributed switch (VDS) networks, each VDS network may include multiple subnets, and each subnet may be considered as a network segment. The controller may manually configure a corresponding relationship among a virtual machine, a VDS identifier, and a subnet identifier, or acquire the corresponding relationship from a virtual machine management platform, when the virtual machine is newly created. In an example, when the virtual machine management platform creates the virtual machine, it may first acquire the VDS identifier configured by the controller, and then establish the virtual machine underneath a VDS network identified by the VDS identifier. Thereafter, the virtual machine management platform may transmit information of the virtual machine and the corresponding VDS identifier to the controller. The controller may find a subnet identifier for an IP address contained in the information of the virtual machine within the VDS network identified by the VDS identifier. In an example, the controller may figure out a network segment to which the IP address contained in the information of the virtual machine belongs, and find a subnet identifier assigned to the network segment. It may then be determined that the subnet identifier corresponds to a MAC address contained in the information of the virtual machine.

In an SDN, when a virtual machine is initially connected to the network, the virtual machine may be considered as newly added, and a virtual switching device responsible of connecting the virtual machine newly added to the network may report information for a newly added port to a controller in charge of the virtual switching device. In an example, the information for the newly added port may include an IP address, a MAC address, a port number, a host identifier, and a tunnel IP address. The IP address may refer to a VM IP address of the virtual machine newly added. The MAC address may refer to a VM MAC address of the virtual machine newly added. The port number may refer to an identification number of the port for connecting the virtual switching device with the virtual machine newly added. The host identifier may refer to an identifier of a host the virtual switching device resides. The tunnel IP address may refer to a local tunnel address used by the host the virtual switching device resides for identifying a tunnel established between the host and another host. In an example, the local tunnel address may be assigned according to an Internet protocol, and therefore is called the tunnel IP address. It should be pointed out that when a tunnel IP address is mentioned in examples of the present disclosure, it may refer to a tunnel address. Except from the tunnel IP address, other descriptions to an IP address, such as a source IP address, a destination IP address, etc., may relate to a VM IP address in examples of the present disclosure.

After receiving information for a newly added port reported by virtual switching devices managed by controllers of the SDN, each of the controllers may generate a global port entry for a newly added port, and determine a subnet identifier corresponding to a MAC address contained in the information for the newly added port. In an example, the global port entry may include: an IP address, a MAC address, a port number, a subnet identifier, a host identifier, and a tunnel IP address, etc. Later on, each of the controllers may synchronize global port entries locally generated to other controllers. Also, the controller may receive and store global port entries provided by other controllers into a global port table locally saved on the controller for synchronization. After the exchange of global port entries among all the controllers, the controllers of the SDN may maintain a global port table including the same global port entries.

Figure 2:
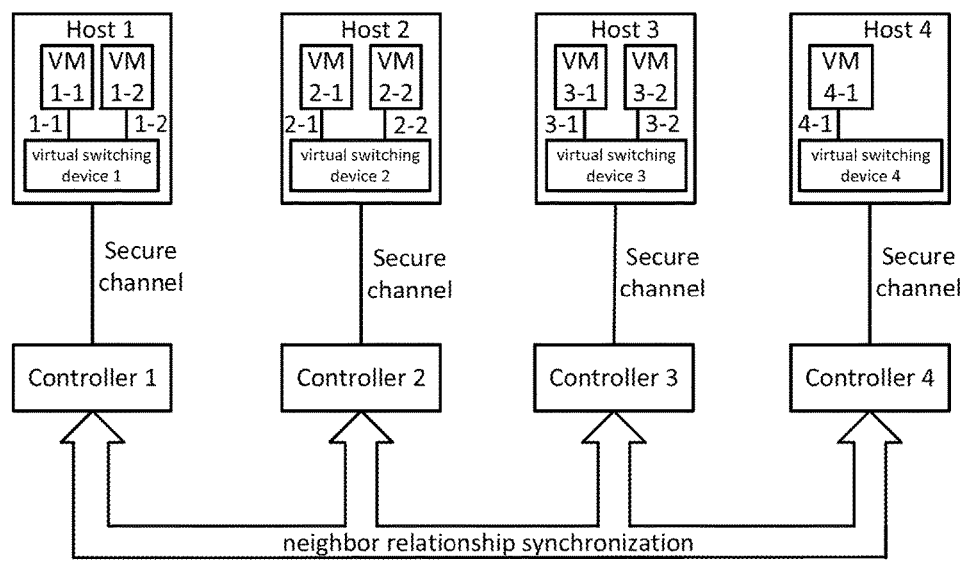
FIG. 2 is a schematic diagram illustrating the network structure of a SDN in accordance with an example of the present disclosure.

FIG. 2 is a schematic diagram illustrating the network structure of a SDN in accordance with an example of the present disclosure. In the SDN, there are a plurality of controllers, each of which may manage a plurality of virtual switching devices over a secure channel. The communication protocol applied for the secure channel can be selected according to practical requirements. In an example, the secure channel may adopt an OpenFlow protocol for supporting the communication between the controller and the virtual switching devices, wherein the secure channel may also be called an OpenFlow channel.

The generation of the global port table may be described in detail hereinafter with reference to the network structure illustrated in FIG. 2. In FIG. 2, the plurality of controllers may be represented as controllers 1-4. In an example, each of controllers 1-4 may be an independent physical device, capable of performing synchronization for neighbor relationships with one another. It is supposed that VM1-1, VM2-1, VM2-2, and VM3-1 are created within the same VDS network. In an example, a MAC address of VM1-1 (indicted as MAC1-1) corresponds to subnet identifier 1, a MAC address of VM2-1 (indicted as MAC2-1) corresponds to subnet identifier 1, a MAC address of VM2-2 (indicted as MAC2-2) corresponds to subnet identifier 2, and a MAC address of VM3-1 (indicted as MAC3-1) corresponds to subnet identifier 2. VM1-1 is connected with virtual switching device 1 via port 1-1. VM2-1 is connected with virtual switching device 2 via port 2-1. VM2-2 is connected with virtual switching device 2 via port 2-2. VM3-1 is connected with virtual switching device 3 via port 3-1.

When a virtual machine connected with a virtual switching device is online, information for a port connecting with the virtual machine may be reported to a controller in charge of the virtual switching device. In an example, the information for the port may include: an IP address, a MAC address, a port number, a host identifier, and a tunnel IP address, etc.

In an example, a configuration procedure for VM1-1, VM2-1, VM2-2, and VM3-1 initially connecting into the network may be described as follows. When virtual switching device 1 detects that VM1-1 is online for the first time, virtual switching device 1 may report information for port 1-1 to controller 1. In an example, the information for port 1-1 may include IP1-1, MAC1-1, port number 1-1, host identifier 1, and IPT1. When virtual switching device 2 is aware of initial log on of VM2-1 into the network, virtual switching device 2 may inform controller 2 of information for port 2-1, which includes IP2-1, MAC2-1, port number 2-1, host identifier 2, and IPT2. When virtual switching device 2 is aware of log on of VM2-2 into the network, virtual switching device 2 may inform controller 2 of information for port 2-2, which includes IP2-2, MAC2-2, port number 2-2, host identifier 2, and IPT2. When virtual switching device 3 is aware of log on of VM3-1 into the network, virtual switching device 3 may inform controller 3 of information for port 3-1, which includes IP3-1, MAC3-1, port number 3-1, host identifier 3, and IPT3.

The controllers may receive information for a newly added port from its managed virtual switching device, determine a subnet identifier for a MAC address contained in the information for the newly added port, and generate a global port entry for the newly added port. Each of the controllers may send global port entries locally generated to other controllers for synchronization, to ensure that the global port tables for the VDS network stored on the controllers record the same content. For example, when controller 1 receives information for port 1-1 reported from virtual switching device 1, and determines that subnet identifier 1 corresponds to MAC1-1, then controller 1 may generate a global port entry (see line 2 of Table 1) for port 1-1. After synchronization, all the controllers may record the same content as illustrated in Table 1 within the global port table.

TABLE 1

| IP address | MAC address | Port number | Subnet identifier | Host identifier | Tunnel IP address |
|---|---|---|---|---|---|
| IP1-1 | MAC1-1 | 1-1 | 1 | 1 | IPT1 |
| IP2-1 | MAC2-1 | 2-1 | 1 | 2 | IPT2 |
| IP2-2 | MAC2-2 | 2-2 | 2 | 2 | IPT2 |
| IP3-1 | MAC3-1 | 3-1 | 2 | 3 | IPT3 |

A virtual machine within a host may initiate a communication via sending a packet. When a virtual switching device connecting with the virtual machine cannot match a flow table for the packet, the virtual switching device may forward the packet or information relating to a header of the packet to a controller via a secure channel (such as an OpenFlow channel).

When the virtual switching device forwards the packet to the controller, the controller may issue a flow table to the virtual switching device, for instructing forwarding of the packet. Also, the controller may record a neighbor relationship based on the packet forwarded by the virtual switching device. In an example, the neighbor relationship may be recorded in neighbor relationship tables, including a first neighbor relationship table and a second neighbor relationship table.

In an example, the first neighbor relationship table may record corresponding relationships between source IP addresses and destination IP addresses of packets forwarded to the controller by virtual switching devices, and use the source IP addresses as indexes of the first neighbor relationship table. In an example, the first neighbor relationship table may be used to search for destination IP addresses having neighbor relationships with a source IP address. That is, the first neighbor relationship table may help to find to which destination IP addresses a port indicated by the source IP address has already sent packets.

In another example, the port indicated by the source IP address may be uniquely represented by a combination of the source IP address and a source MAC address. That is, when an IP address of a virtual machine is not globally unique, i.e., different virtual machines within the SDN may have the same IP address, the first neighbor relationship table may further record a MAC address of the packet as the source MAC address. Accordingly, the first neighbor relationship table may record corresponding relationships among source IP addresses, source MAC addresses, and destination IP addresses. Then, a combination of an IP address and a MAC address may be used for matching destination IP addresses. In an example, "matching" may refer to satisfying a predetermined relationship.

In an example, the second neighbor relationship table may record corresponding relationships between destination IP addresses and source IP addresses of the packets forwarded to the controller by the virtual switching devices, and use the destination IP addresses as indexes of the second neighbor relationship table. In an example, the second neighbor relationship table may be used to search for source IP addresses having neighbor relationships with a destination IP address. That is, the second neighbor relationship table may help to find from which source IP addresses a port indicated by the destination IP address has already received packets.

In an example, the second neighbor relationship table may further record a subnet identifier of the destination IP address of the packet. Accordingly, the second neighbor relationship table may record corresponding relationships among destination IP addresses, subnet identifiers, and source IP addresses. Then, a combination of an IP address and a corresponding subnet identifier may be used for matching source IP addresses. That is, the port indicated by the destination IP address may be uniquely represented by a combination of the destination IP address and a subnet identifier. In an example, the controller may get a destination IP address from a packet received, and find a corresponding subnet identifier for the destination IP address within the global port table. In an example, since a plurality of VDS networks may be configured on a control plane, there is a possibility that multiple subnet identifiers may be found by use of the destination IP address for matching. When the multiple subnet identifiers are found, the controller may use a source IP address and a source MAC address of the packet received to find a first subnet identifier identifying a first subnet from the global port table, and determine second subnet identifiers identifying subnets capable of communicating with the first subnet. The controller may compare the multiple subnet identifiers found and the second subnet identifiers to acquire a real subnet identifier corresponding to the destination IP address.

In another example, the controller may use the source IP address and the source MAC address of the packet received to determine a VDS network for the virtual machine sending the packet, and then use the destination IP address of the packet received to match a unique subnet identifier within a global port table corresponding to the VDS network.

When the virtual switching device forwards information relating to a header of the packet to the controller, the controller may perform a similar processing as the procedure of receiving the packet from the virtual switching device, which may not be described repeatedly herein.

The generation of the neighbor relationship tables may be described in detail hereinafter with reference to the network structure illustrated in FIG. 2.

It is supposed that controller 1 may receive packets sending from VM1-1 to VM2-1, VM2-2, and VM3-1, respectively. Accordingly, first neighbor relationship items locally generated by controller 1 may be illustrated in Table 2, and second neighbor relationship items locally generated by controller 1 may be illustrated in Table 3. In an example, subnet identifiers corresponding to destination IP addresses of the packets may be found from a global port table based on the destination IP addresses.

TABLE 2

| Source IP address | Source MAC address | Destination IP address |
|---|---|---|
| IP1-1 | MAC1-1 | IP2-1 |
| IP1-1 | MAC1-1 | IP2-2 |
| IP1-1 | MAC1-1 | IP3-1 |

TABLE 3

| Destination IP address | Subnet identifier | Source IP address |
|---|---|---|
| IP2-1 | 1 | IP1-1 |
| IP2-2 | 2 | IP1-1 |
| IP3-1 | 2 | IP1-1 |

It is supposed that controller 2 may receive a packet sending from VM2-1 to VM1-1. Accordingly, a first neighbor relationship item locally generated by controller 2 may be illustrated in Table 4, and a second neighbor relationship item locally generated by controller 2 may be illustrated in Table 5.

TABLE 4

| Source IP address | Source MAC address | Destination IP address |
|---|---|---|
| IP2-1 | MAC2-1 | IP1-1 |

TABLE 5

| Destination IP address | Subnet identifier | Source IP address |
|---|---|---|
| IP1-1 | 1 | IP2-1 |

Each of the controllers may send neighbor relationship items locally generated by itself to other controllers for synchronization. For example, controller 1 may send neighbor relationship items illustrated in Tables 2 and 3 to controllers 2-4, respectively. Each of controllers 2-4 may add the neighbor relationship items provided by controller 1 into their neighbor relationship tables. Also, controller 2 may send neighbor relationship items illustrated in Tables 4 and 5 to controllers 1, 3, and 4, respectively. After the synchronization of the neighbor relationship tables among the controllers, all the controllers may store the neighbor relationship tables with the same content. In an example, the first neighbor relationship table after synchronization is illustrated in Table 6, and the second neighbor relationship table after synchronization is illustrated in Table 7.

TABLE 6

| Source IP address | Source MAC address | Destination IP address |
|---|---|---|
| IP1-1 | MAC1-1 | IP2-1 |
| IP1-1 | MAC1-1 | IP2-2 |
| IP1-1 | MAC1-1 | IP3-1 |
| IP2-1 | MAC2-1 | IP1-1 |

TABLE 7

| Destination IP address | Subnet identifier | Source IP address |
|---|---|---|
| IP2-1 | 1 | IP1-1 |
| IP2-2 | 2 | IP1-1 |
| IP3-1 | 2 | IP1-1 |
| IP1-1 | 1 | IP2-1 |

Figure 3:
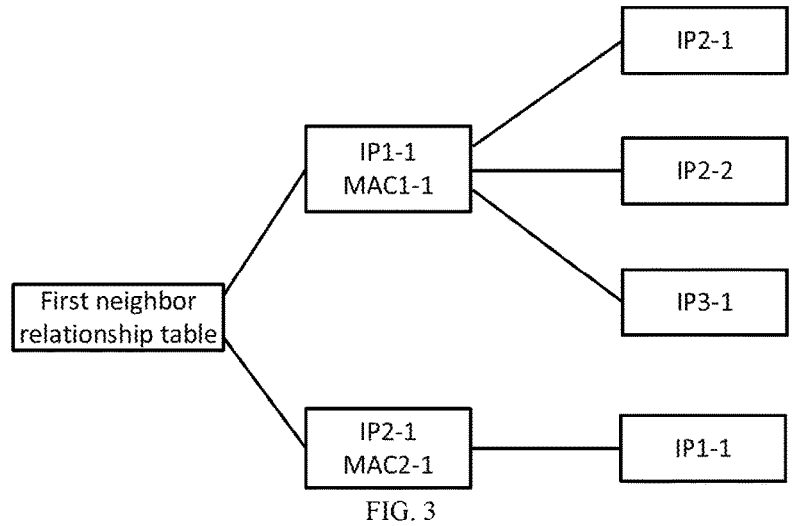
FIG. 3 illustrates a Hash table format for presenting content of a first neighbor relationship table in accordance with an example of the present disclosure.
Figure 4:
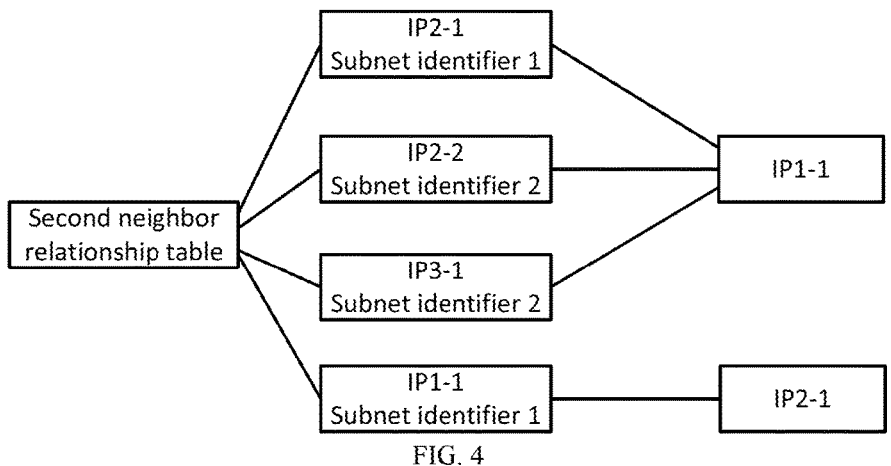
FIG. 4 illustrates a Hash table format for presenting content of a second neighbor relationship table in accordance with an example of the present disclosure.

In an example, in order to raise the efficiency for traversing the neighbor relationship tables, the neighbor relationship tables, including the first neighbor relationship table and the second neighbor relationship table, may be stored using a format such as a Hash table. Specifically, FIG. 3 illustrates a Hash table format for presenting content of Table 6, and FIG. 4 illustrates a Hash table format for presenting content of Table 7.

After the generation of the neighbor relationship tables, the controllers may maintain and update the neighbor relationship tables when there are changes for data forwarding within the SDN, such as aging of flow tables, or deleting of virtual machines.

Figure 5:
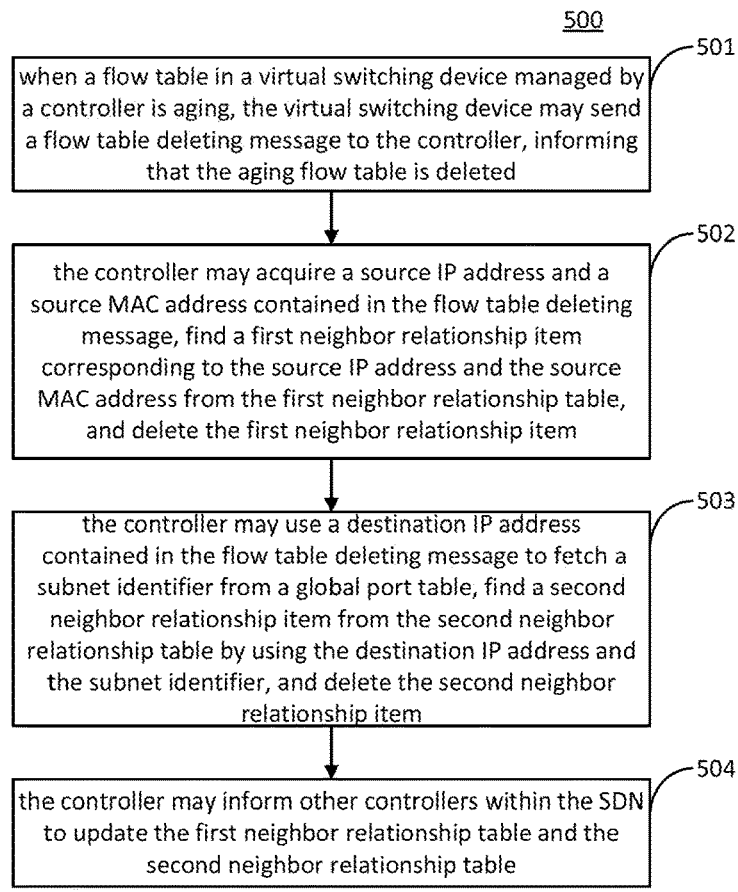
FIG. 5 is a flow chart illustrating a method 500 of updating neighbor relationship tables when a flow table is aging in accordance with an example of the present disclosure.

FIG. 5 is a flow chart illustrating a method 500 of updating neighbor relationship tables when a flow table is aging in accordance with an example of the present disclosure. In examples of the present disclosure, the neighbor relationship tables may include a first neighbor relationship table and a second neighbor relationship table.

At block 501, when a flow table in a virtual switching device managed by a controller is aging, the virtual switching device may send a flow table deleting message to the controller, informing that the aging flow table is deleted. The flow table deleting message may include information relating to the aging flow table, such as a source IP address, a source MAC address, and a destination IP address for flow table matching.

At block 502, when the controller receives the flow table deleting message, the controller may acquire the source IP address and the source MAC address contained in the flow table deleting message, find a first neighbor relationship item corresponding to the source IP address and the source MAC address from the first neighbor relationship table, and delete the first neighbor relationship item.

At block 503, the controller may use a destination IP address contained in the flow table deleting message to fetch a subnet identifier from a global port table, find a second neighbor relationship item from the second neighbor relationship table which corresponds to the destination IP address and the subnet identifier, and delete the second neighbor relationship item.

In an example, when the controller uses the destination IP address to fetch a subnet identifier from the global port table, there may be multiple subnet identifiers found. In an example, the multiple subnet identifiers corresponding to the destination IP address in the global port table may identify a second subnet and a fifth subnet. Thereafter, the controller may further use the source IP address and the source MAC address contained in the flow table deleting message to get a first subnet identifier identifying a first subnet from the global port table. The controller may find that subnets capable of communicating with the first subnet include the second subnet, a third subnet, and a fourth subnet. Comparing the subnets capable of communicating with the first subnet with the subnets identified by the multiple subnet identifiers, the controller may come to a conclusion that a second subnet identifier identifying the second subnet is a real subnet identifier for the destination IP address.

After the operations at blocks 502 and 503, the first neighbor relationship table and the second neighbor relationship table stored in the controller may be updated to reflect the aging of the flow table.

At block 504, the controller may inform other controllers within the SDN to update the first neighbor relationship table and the second neighbor relationship table. Thus, the neighbor relationship tables stored in controllers of the SDN may be identical after the updating of the neighbor relationship tables.

In an example, the controller may provide a flow table deleting message to other controllers, to cause other controllers to perform similar operations as the controller does at blocks 502 and 503. In another example, the controller may inform other controllers of the deleted first neighbor relationship item and second neighbor relationship item, to avoid repeated searching for the neighbor relationship items on the other controllers.

A detailed scenario for presenting the update procedure illustrated in FIG. 5 may be described in combination with the network structure of FIG. 2.

It is supposed that virtual switching device 1 detects an aging flow table having a source IP address indicated as IP1-1, a source MAC address indicated as MAC1-1, and a destination IP address indicated as IP2-1. Virtual switching device 1 may send a flow table deleting message to controller 1, accordingly. The flow table deleting message may include IP1-1, MAC1-1, and IP2-1.

After receiving the flow table deleting message, controller 1 may use IP1-1 and MAC1-1 to match a first neighbor relationship item within the first neighbor relationship table. Thereafter, the first neighbor relationship item is deleted from the first neighbor relationship table stored in controller 1. In an example, the content of the first neighbor relationship item may be (IP1-1, MAC1-1, IP2-1).

In an example, controller 1 may use IP2-1 to get subnet identifier 1 from the global port table, and use both IP2-1 and subnet identifier 1 to match a second neighbor relationship item within the second neighbor relationship table. Thereafter, the second neighbor relationship item is deleted from the second neighbor relationship table stored in controller 1. In an example, the content of the second neighbor relationship item may be (IP2-1, IP1-1).

After controller 1 updates the first neighbor relationship table and the second neighbor relationship table stored in itself, it may notify other controllers, such as controller 2, controller 3, and controller 4 to update their local first and second neighbor relationship tables.

Figure 6:
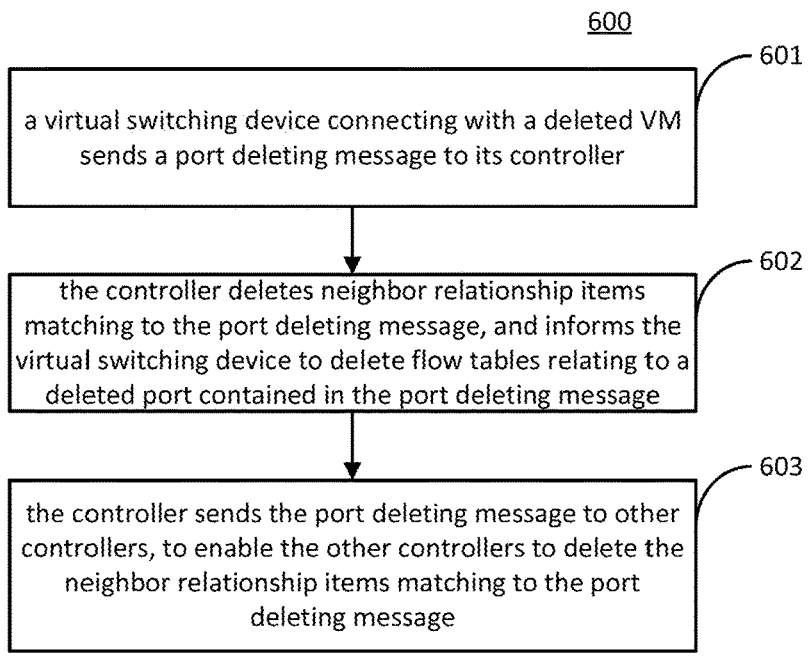
FIG. 6 is a flow chart illustrating a method 600 of updating neighbor relationship tables when a virtual machine (VM) is deleted in accordance with an example of the present disclosure.

FIG. 6 is a flow chart illustrating a method 600 of updating neighbor relationship tables when a virtual machine (VM) is deleted in accordance with an example of the present disclosure.

At block 601, when the VM is deleted, a virtual switching device connecting with the VM and managed by a controller may perceive deletion of a port connecting with the VM, and send a port deleting message to the controller. The port deleting message may include information for a deleted port, indicating a port connecting with the deleted VM. In an example, the virtual switching device may carry in the port deleting message information having the same fields as when a port is newly added.

At block 602, when the controller receives the port deleting message, the controller may delete neighbor relationship tables relating to the deleted port contained in the port deleting message, and also delete flow tables relating to the deleted port from the virtual switching device.

In an example, the process at block 602 of deleting the neighbor relationship tables relating to the deleted port may be as follows. The controller may use an IP address and a MAC address contained in the port deleting message to search for a first neighbor relationship item within the first neighbor relationship table, and delete the first neighbor relationship item found. Also, the controller may use the IP address contained in the port deleting message to search for a subnet identifier from the global port table, and use the IP address contained in the port deleting message and the subnet identifier to search for a second neighbor relationship item within the second neighbor relationship table. If the second neighbor relationship item is found, the controller may delete it from the second neighbor relationship table.

At block 603, the controller may send the port deleting message to other controllers, to enable the other controllers to delete the first neighbor relationship item and the second neighbor relationship item matching to the port deleting message, to enable the other controllers to inform virtual switching devices managed by the other controllers to delete flow tables relating to the deleted port.

A detailed scenario for presenting the update procedure illustrated in FIG. 6 may be described in combination with the network structure of FIG. 2. It is supposed that VM2-1 is deleted, then virtual switching device 2 may send a port deleting message to controller 2, which carries information for port 2-1 indicating that port 2-1 is deleted. In an example, the information for port 2-1 may include IP2-1, MAC2-1, and port number 2-1, etc.

After receiving the port deleting message, controller 2 may search up in the first neighbor relationship table according to IP2-1 and MAC2-1, find a first neighbor relationship item with the content (IP2-1, MAC2-1, IP1-1), and delete the first neighbor relationship item found. Controller 2 may also use IP2-1 to find a corresponding subnet identifier within the global port table. In an example, the corresponding subnet identifier may be subnet identifier 1. Then, controller 2 may use IP2-1 and subnet identifier 1 to find and delete a second neighbor relationship item from the second neighbor relationship table. The second neighbor relationship item found may have the content (IP2-1, 1, IP1-1).

Thereafter, controller 2 may inform virtual switching device 2 to delete flow tables relating to IP2-1 and MAC2-1, and send a port deleting message to controllers 1, 3, and 4. Controllers 1, 3, and 4 may do the same processing as controller 2 after receiving the port deleting message, respectively. That is, each of controllers 1, 3, and 4 may delete neighbor relationship items relating to the port deleting message, determine whether a virtual machine managed by the controller has sent a packet to VM2-1, and inform a virtual switching device connecting with the virtual machine to delete flow tables relating to the port deleting message, if yes.

Figure 7:
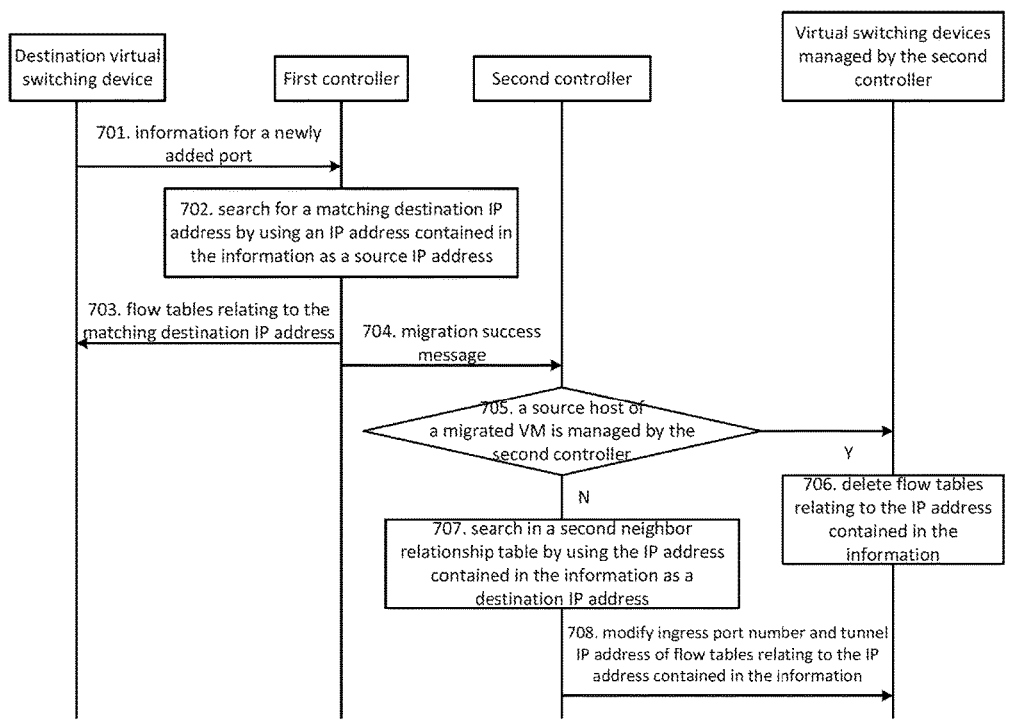
FIG. 7 is a flow chart illustrating a method of migrating virtual machines in accordance with an example of the present disclosure.

FIG. 7 is a flow chart illustrating a method of migrating virtual machines in accordance with an example of the present disclosure. It is supposed that a virtual machine, which may be called a migrated virtual machine hereinafter, is migrated from a source virtual switching device to a destination virtual switching device. The destination virtual switching device is managed by a first controller. A host the source virtual switching device resides may be called a source host.

At block 701, the destination virtual switching device may send a port adding message to the first controller. The port adding message may include information for a newly added port, for indicating a port of the destination virtual switching device connecting with the migrated virtual machine.

At block 702, the first controller may use an IP address contained in the information for the newly added port as a source IP address, to search a matching destination IP address within a first neighbor relationship table.

At block 703, the first controller may generate flow tables relating to the matching destination IP address according to a global port table, and send the flow tables relating to the matching destination IP address to the destination virtual switching device. Then, the first controller may update flow tables stored in virtual switching devices managed by the first controller according to the information for the newly added port.

In an example, the generation of the flow tables relating to the matching destination IP address at block 703 may be as follows. The first controller may find a port number and a tunnel IP address for the matching destination IP address from the global port table. Then, the first controller may record the port number and the tunnel IP address found into the flow tables relating to the matching destination IP address.

Additionally, the first controller may update a global port entry corresponding to the information for the newly added port. In an example, the update of the flow tables stored in the virtual switching devices managed by the first controller at block 703 may be as follows. The first controller may obtain a subnet identifier from the global port table according to the IP address and a MAC address contained in the information for the newly added port. The first controller may use the IP address contained in the information for the newly added port as a destination IP address, and search for a matching source IP address within a second neighbor relationship table according to the destination IP address and the subnet identifier. The first controller may send flow tables relating to the matching source IP address to the virtual switching devices managed by the first controller. In an example, the virtual switching devices managed by the first controller may include the destination virtual switching device.

At block 704, the first controller may send a migration success message to a second controller carrying the information for the newly added port. The second controller may be other controllers within the SDN, which is different from the first controller.

At block 705, the second controller may determine whether the source host is managed by the second controller. If yes, block 706 may be performed. If no, blocks 707-708 may be performed.

In an example, the process at block 705 of determining whether the source host is managed by the second controller may be as follows. The second controller may acquire the source host of the migrated virtual machine from a virtual machine management platform, and compare a host identifier of the source host with host identifiers managed by itself. If the host identifier of the source host is within the host identifiers managed by itself, it is determined that the source host is managed by the second controller.

At block 706, the second controller may inform the virtual switching devices managed by itself to delete flow tables relating to the IP address contained in the information for the newly added port.

At block 707, the second controller may use the IP address contained in the information for the newly added port as a destination IP address, to search a matching source IP address within a second neighbor relationship table.

At block 708, when the matching source IP address is found, the second controller may inform virtual switching devices managed by the second controller to modify an ingress port number of flow tables relating to the IP address contained in the information for the newly added port to a port number contained in the information for the newly added port, and also modify a tunnel IP address of the flow tables to a tunnel IP address contained in the information for the newly added port, in response to a determination that a host identifier correspond to the matching source IP address in the global port table identifies a host managed by the second controller.

In an example, the process at block 708 of determining whether the host identifier having the corresponding relationship with the matching source IP address in the global port table identifies the host managed by the second controller is performed by the second controller as follows.

Firstly, the second controller may search for a subnet identifier corresponding to the matching source IP address within the global port table. That is, a corresponding relationship between the subnet identifier and the matching source IP address may be recorded in the global port table. In an example, a single subnet identifier may be found. In another example, multiple subnet identifiers may be found.

When the single subnet identifier is found, the second controller may further decide whether a host identifier corresponds to the single subnet identifier and the matching source IP address is identical with a host identifier of the host managed by the second controller. In this way, it may be determined whether the host identifier having the corresponding relationship with the matching source IP address in the global port table identifies the host managed by the second controller.

When the multiple subnet identifiers are found at block 708, the second controller may select a real subnet identifier for the matching source IP address from the multiple subnet identifier. If a host identifier corresponding to the source IP address and the real subnet identifier in the global port table is identical with a host identifier managed by the second controller, it is determined that the host identifier having the corresponding relationship with the matching source IP address in the global port table identifies the host managed by the second controller.

In an example, the second controller may use the IP address and the MAC address contained in the information for the newly added port to find the real subnet identifier from the multiple subnet identifiers. Specifically, the second controller may use the IP address and the MAC address contained in the information for the newly added port to find a first subnet identifier identifying a first subnet from the global port table. The first subnet identifier is uniquely corresponding to the IP address and the MAC address in the global port table. The second controller may determine other subnet identifiers identifying other subnets capable of communicating with the first subnet from a virtual routing table. The other subnets may include a second subnet identified by a second subnet identifier, a third subnet identified by a third subnet identifier, and a fourth subnet identified by a fourth subnet identifier. Then, the second controller may compare the multiple subnet identifiers found and the other subnet identifiers including {the second subnet identifier, the third subnet identifier, the fourth subnet identifier} to acquire the real subnet identifier for the destination IP address. In an example, the real subnet identifier may be such as the second subnet identifier.

In an example, the second controller may obtain a first subnet identifier based on the IP address and the MAC address contained in the information for the newly added port, and find a second subnet and a third subnet capable of communicating with a first subnet identified by the first subnet identifier with the help of the virtual routing table. Then, the second controller may find a matching destination IP address from the first neighbor relationship table by using the IP address and the MAC address contained in the information for the newly added port as the source IP address and the source MAC address, respectively. The second controller may determine whether the matching destination IP address is within the second subnet, and if yes, record a second subnet identifier of the second subnet as the real subnet identifier. If the determination result is no, then the second controller may further determine whether the matching destination IP address is within the third subnet, and if yes, record a third subnet identifier of the third subnet as the real subnet identifier.

When an IP address of a virtual machine is not globally unique, the procedure of virtual machine migration may be implemented with the aid of a MAC address of the virtual machine, since a combination of the IP address and the MAC address may uniquely identified the virtual machine. In an example, when VM1-1 illustrated in FIG. 2 is migrated from host 1 to host 4, the procedure of migrating VM1-1 may be implemented as follows, wherein FIG. 8 illustrates the network structure of the SDN after migration.

Figure 8:
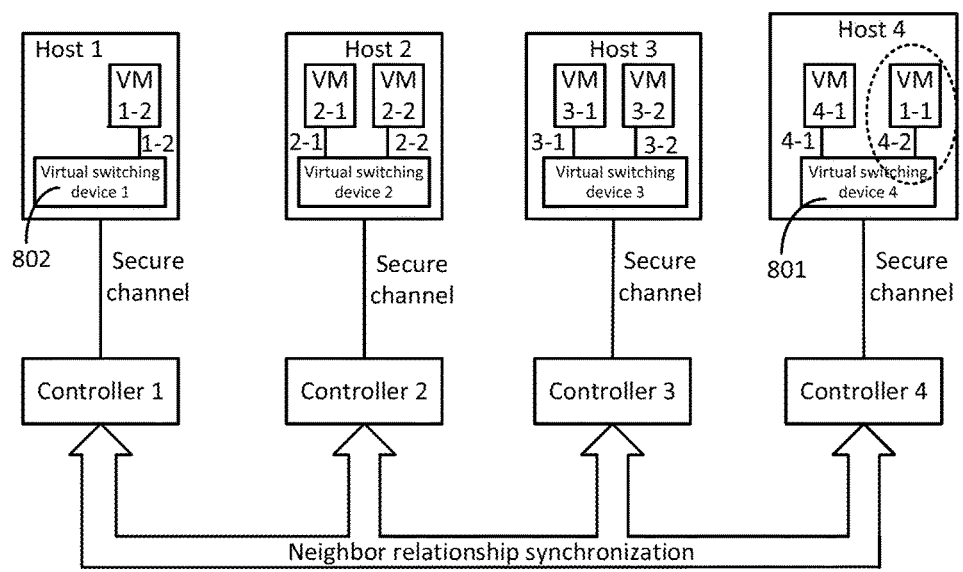
FIG. 8 illustrates the network structure of the SDN after migration, wherein VM1-1 illustrated in FIG. 2 is migrated from host 1 to host 4.

In FIG. 8, since VM1-1 is migrated from host 1 to host 4, virtual switching device 4 managed by host 4 may report information for a newly added port to host 4, for providing information for newly added port 4-2 connecting with VM1-1 to host 4. It can be seen that virtual switching device 4 is a destination virtual switching device 801, while virtual switching device 1 is a source virtual switching device 802.

The information for the newly added port may include an IP address indicated as IP1-1, a MAC address indicated as MAC1-1, a port number 4-2, and a tunnel IP address indicated as IPT4. Specifically, IP1-1 and MAC1-1 are an IP address and a MAC address of VM1-1, respectively. The port of virtual switching device 4 connecting with VM1-1 is indicated as port number 4-2. IPT4 is a local tunnel address used in host 4, indicating a tunnel for connecting host 4 and other hosts.

In an example, controller 4 may perform a matching in a first neighbor relationship table according to the IP address and the MAC address contained in the information for the newly added port. In an example, the first neighbor relationship table may be illustrated in Table 6. Then, controller 4 may use IP1-1 and MAC1-1 to search for corresponding items in Table 6, and 3 items may be matched. The destination IP addresses of the 3 items may be IP2-1, IP2-2, and IP3-1, respectively. Then, controller 4 may send flow tables relating to IP2-1, IP2-2, and IP3-1 to virtual switching device 4. In an example, the flow tables relating to IP2-1, IP2-2, and IP3-1 may instruct packet forwarding from VM1-1 to VM2-1, VM2-1, and VM3-1, respectively. In real practice, a flow table may be sent to the destination virtual switching device 801 once a first neighbor relationship item is found, or flow tables may be sent to the destination virtual switching device 801 after all the first neighbor relationship items are found.

Controller 4 may send a migration success message to other controllers, which may be controller 1, controller 2, and controller 3 illustrated in FIG. 8. The migration success message may include the information for the newly added port, i.e., in this example, the information for newly added port 4-2. Since the source host of the migrated VM is managed by controller 1, controller 1 may perform operations different from those of controller 2 and controller 3.

As to controller 1, after receiving the migration success message and knowing that the source host is managed by itself via a VM management platform, controller 1 may inform virtual switching device 1 within host 1 to delete flow tables relating to IP1-1 and MAC1-1 contained in the information for the newly added port.

As to controller 2 and controller 3, after receiving the migration success message and knowing that the source host is not managed by itself via the VM management platform, controller 2 or 3 may acquire subnet identifier 1 from a global port table according to an IP address contained in the information for the newly added port 4-2 provided via the migration success message, and search for a matching source IP address in a second neighbor relationship table by using subnet identifier 1 and IP1-1. In an example, the second neighbor relationship table may be illustrated in Table 7, and IP1-1 is used as the destination IP address during the matching. It can be seen that 1 item may be found, which has a source IP address IP2-1. Controller 2 or 3 may then acquire host identifier 2 from the global port table by using IP2-1, respectively.

In an example, it is determined by controller 2 that host 2 identified by host identifier 2 is managed by controller 2. Thus, controller 2 may inform virtual switching devices managed by itself to modify flow tables, via such as a flow table modifying message. Specifically, controller 2 may instruct the virtual switching devices to modify a port number 1-1 and a tunnel IP address IPT1 of the flow tables relating to IP1-1 and MAC1-1 into a port number 4-1 and a tunnel IP address IPT4. In an example, the flow table modifying message may include a destination IP address IP1-1, a destination MAC address MAC1-1, a port number 4-1, and a tunnel IP address IPT4. As to controller 3, it is determined that host 2 identified by host identifier 2 is not managed by controller 3. Thus, controller 3 may perform no further processing.

Figure 9:
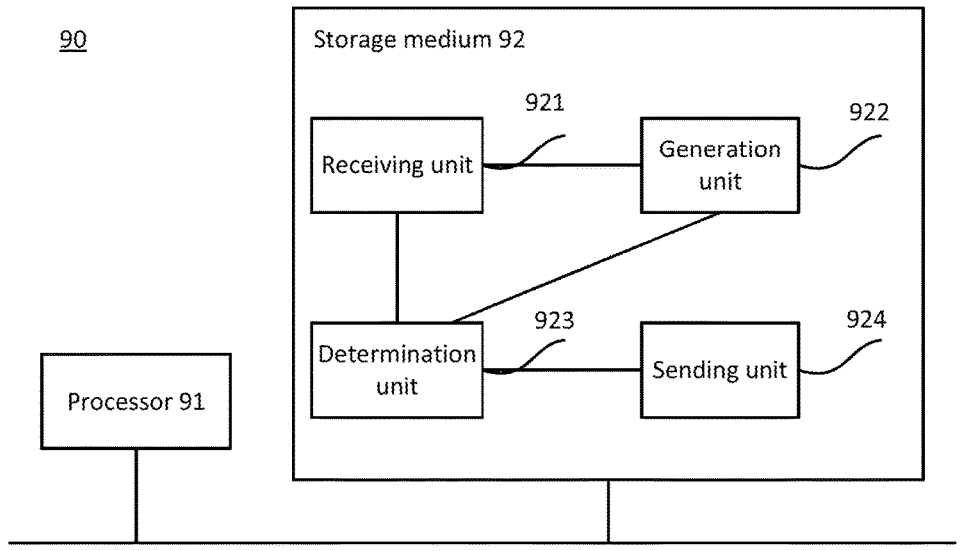
FIG. 9 is a block diagram illustrating the structure of a controller 90 within a SDN in accordance with an example of the present disclosure.

FIG. 9 is a block diagram illustrating the structure of a controller 90 within a SDN in accordance with an example of the present disclosure. The controller 90 may include: a processor 91, a non-transitory machine readable storage medium 92, and program units stored in the non-transitory machine readable storage medium 92 and executable by the processor 91. The program units may include: a receiving unit 921, a generation unit 922, a determination unit 923, and a sending unit 924.

The receiving unit 921 may receive information for a newly added port generated for a migrated virtual machine, and receive packets forwarded by virtual switching devices managed by the controller 90. In an example, when a virtual machine is migrated from a source host to a destination host, the information for the newly added port may be generated and sent to a controller managing the destination host.

The generation unit 922 may generate a first neighbor relationship table according to source Internet protocol (IP) addresses and destination IP addresses of the packets.

The determination unit 923 may use an LP address contained in the information for the newly added port as a source IP address, to find a matching destination IP address within the first neighbor relationship table.

The sending unit 924 may send flow tables relating to the matching destination IP address to a destination virtual switching device of the migrated virtual machine, update flow tables stored in the virtual switching devices managed by the controller, and send a migration success message including the information for the newly added port to a second controller, to enable the second controller to update flow tables stored in virtual switching devices managed by the second controller. In an example, the second controller may be any other controller different from the controller 90 within the SDN.

In an example, the receiving unit 921 may further receive a second migration success message from a third controller. The determination unit 923 may further determine whether a source host of a second migrated virtual machine indicated in the second migration success message is managed by the controller 90.

The sending unit 924 may inform virtual switching devices managed by the controller 90 to delete flow tables relating to an IP address contained in second information for a newly added port included in the second migration success message, in response to a determination made by the determination unit 923 that the source host is managed by the controller 90.

In response to a determination made by the determination unit 923 that the source host is not managed by the controller 90, the sending unit 924 may trigger the determination unit 923 to use the IP address contained in the second information for the newly added port as a destination IP address to find a matching source IP address within a second neighbor relationship table, and inform virtual switching devices managed by the controller 90 to modify ingress port numbers and tunnel IP addresses of the flow tables relating to the IP address contained in the second information for the newly added port into a port number and a tunnel IP address recorded in the second information for the newly added port, respectively, in response to a determination that a host identifier corresponding to the matching source IP address in the global port table identifies a host managed by the controller 90.

In an example, the generation unit 922 may add a first neighbor relationship item into the first neighbor relationship table when the receiving unit 921 receives a first packet from a virtual switching device managed by the controller 90. The first neighbor relationship item may record a corresponding relationship between a source IP address and a destination IP address of the first packet, and use the source IP address of the first packet as an index of the first neighbor relationship item.

Accordingly, the generation unit 922 may add a second neighbor relationship item into a second neighbor relationship table. The second neighbor relationship item may record a corresponding relationship between the destination IP address and the source IP address of the first packet received by the receiving unit 921, and use the destination IP address of the first packet as an index of the second neighbor relationship item.

Thereafter, the generation unit 922 may instruct the sending unit 924 to send the first neighbor relationship item and the second neighbor relationship item to the second controller for synchronization.

In an example, the generation unit 922 may record corresponding relationships among the source IP addresses, source media access control (MAC) addresses, and the destination IP addresses of the packets into the first neighbor relationship table. Then, using a combination of a source IP address and a source MAC address may uniquely find a destination IP address within the first neighbor relationship table. The determination unit 923 may search for a first neighbor relationship item having the IP address contained in the information for the newly added port as the source IP address and having a MAC address contained in the information for the newly added port as a source MAC address within the first neighbor relationship table, and take a destination IP address recorded in the first neighbor relationship item as the matching destination IP address.

In an example, the generation unit 922 may record corresponding relationships among destination IP addresses, subnet identifiers, and source IP addresses of the packets in a second neighbor relationship table. The subnet identifiers may be found from a global port table based on the destination IP addresses of the packets. The determination unit 923 may obtain a subnet identifier from a global port table according to the IP address and a MAC address contained in the information for the newly added port, and search for a matching source IP address within the second neighbor relationship table by using the IP address contained in the information for the newly added port as the destination IP address and the subnet identifier obtained.

In an example, the receiving unit 921 may receive a flow table deleting message. The generation unit 922 may delete from the first neighbor relationship table, a first neighbor relationship item corresponding to a source IP address and a source MAC address contained in the flow table deleting message. The generation unit 922 may obtain a subnet identifier from a global port table according to a destination IP address contained in the flow table deleting message, and delete from a second neighbor relationship table, a second neighbor relationship item by using the destination IP address contained in the flow table deleting message and the subnet identifier obtained.

In an example, the receiving unit 921 may receive a port deleting message. The generation unit 922 may delete a first neighbor relationship item and a second neighbor relationship item matching to the port deleting message. The sending unit 924 may inform the virtual switching device to delete flow tables relating to a port indicated in the port deleting message, and send the port deleting message to other controllers, to enable the other controllers to delete the first neighbor relationship item and the second neighbor relationship item matching to the port deleting message, and to enable the other controllers to inform virtual switching devices managed by the other controllers to delete flow tables relating to the port indicated in the port deleting message.

In an example, for determining whether a host identifier corresponding to the matching source IP address in the global port table identifies a host managed by the controller 90, the determination unit 923 may search in the global port table for a subnet identifier according to the matching source IP address. When a single subnet identifier is found, the determination unit 923 may obtain a host identifier corresponding to the matching source IP address and the single subnet identifier, and determine whether the host identifier obtained is identical with a host identifier of the host managed by the controller 90. When multiple subnet identifiers are found, the determination unit 923 may use the IP address and the MAC address contained in the second information for the newly added port to find a first subnet identifier identifying a first subnet from the global port table, determine second subnet identifiers identifying subnets capable of communicating with the first subnet, and compare the multiple subnet identifiers found and the second subnet identifiers to acquire a real subnet identifier for the matching source IP address. The determination unit 923 may determine that the host identifier corresponding to the matching source IP address in the global port table identifies the host managed by the controller 90, when it is determined that the host identifier corresponding to the matching source IP address and the real subnet identifier within the global port table is identical with the host identifier of the host managed by the controller 90.

The units described in the above mentioned examples can be integrated into a physical device, or deployed separately within different physical devices. Also, the units can be combined into a single unit, or further split into multiple subunits.

Figure 10:
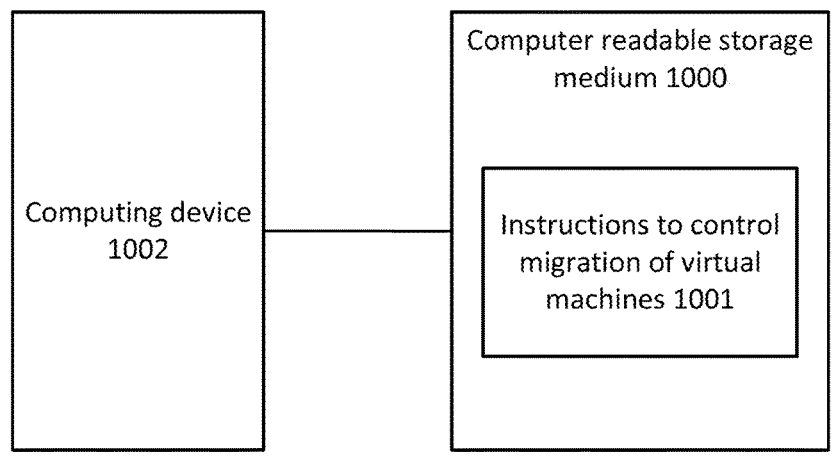
FIG. 10 is a block diagram illustrating computer readable storage medium for controlling virtual machine migration according to an example of the present disclosure.

FIG. 10 is a block diagram illustrating computer readable storage medium 1000 for controlling virtual machine migration according to an example of the present disclosure. In an example, the computer readable storage medium 1000 may be a non-transitory storage medium, storing one or more programs configured to be executed by a computing device 1002. In an example, the computing device 1002 may be a controller within an SDN.

In an example, the programs may include instructions 1001 to: receive information for a newly added port generated for a migrated virtual machine, and search for a matching destination internet protocol (IP) address within a first neighbor relationship table by using an IP address contained in the information for the newly added port as a source IP address; send flow tables relating to the matching destination IP address to a destination virtual switching device of the migrated virtual machine, and update flow tables stored in virtual switching devices managed by the controller, and send a migration success message carrying the information for the newly added port to a second controller, to enable the second controller to update flow tables stored in virtual switching devices managed by the second controller.

In an example, the first neighbor relationship table includes source IP addresses and destination IP addresses of packets forwarded via virtual switching devices managed by controllers within the SDN.

In an example, the programs may further include instructions 1001 to: after receiving a second migration success message from a third controller, inform virtual switching devices managed by the controller to delete flow tables relating to an IP address contained in second information for a newly added port included in the second migration success message, in response to a determination that a source host of a second migrated virtual machine indicated in the second migration success message is managed by the controller.

In response to a determination that the source host is not managed by the controller, the IP address contained in the second information for the newly added port may be used as a destination IP address, to find a matching source IP address within a second neighbor relationship table. In an example, the second neighbor relationship table includes destination IP addresses and source IP addresses of the packets forwarded via the virtual switching devices managed by the controllers within the SDN.

When the matching source IP address is found, determine whether a host identifier having a corresponding relationship with the matching source IP address in a global port table identifies a host managed by the controller, and inform virtual switching devices managed by the controller to modify ingress port numbers and tunnel IP addresses of the flow tables relating to the IP address contained in the second information for the newly added port into a port number and a tunnel IP address recorded in the second information for the newly added port, respectively, in response to a determination that the host identifier identifies a host managed by the controller.

In an example, the programs may further include instructions 1001 to: add a first neighbor relationship item into the first neighbor relationship table when the controller receives a first packet from a virtual switching device managed by the controller, add a second neighbor relationship item into a second neighbor relationship table, and send the first neighbor relationship item and the second neighbor relationship item to the second controller for synchronization.

In an example, the first neighbor relationship item may record a corresponding relationship between a source IP address and a destination IP address of the first packet, and use the source IP address of the first packet as an index of the first neighbor relationship item.

In an example, the second neighbor relationship item may record a corresponding relationship between the destination IP address and the source IP address of the first packet, and use the destination IP address of the first packet as an index of the second neighbor relationship item.

In view of the examples disclosed above, neighbor relationship tables may be recorded for storing neighbor relationships of virtual machines on controllers within the SDN, and further synchronized among the controllers. When a virtual machine is migrated from a source host to a destination host, or migrated from a source virtual switching device to a destination virtual switching device, the neighbor relationship tables may be inquired to find flow tables to be sent to the destination virtual switching device and flow tables to be updated, without storing on the controllers copies of all the flow tables previously sent to virtual switching devices. Thus, operations of the controllers may be simplified, and resources of the controllers may be saved up.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the present disclosure and its practical applications, to thereby enable others skilled in the art to best utilize the present disclosure and various examples with various modifications as are suited to the particular use contemplated. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A method of migrating a virtual machine, comprising:
   in response to receiving information of a newly added port generated for a migrated virtual machine, searching, by a first controller within a software defined network (SDN), for a matching destination Internet protocol (IP) address within a first neighbor relationship table when an IP address contained in the information of the newly added port is taken as a source IP address;
   sending, by the first controller, flow tables relating to the matching destination IP address to a destination virtual switching device of the migrated virtual machine, and updating flow tables stored in virtual switching devices managed by the first controller;
   sending, by the first controller, a migration success message including the information of the newly added port to a second controller, to enable the second controller to update flow tables stored in virtual switching devices managed by the second controller;
   wherein the first neighbor relationship table includes source IP addresses and destination IP addresses of packets forwarded via virtual switching devices managed by controllers within the SDN; and
   prohibiting storage of one or more copies of the updated flow tables in the first and second controllers.

2. The method according to claim 1, wherein the first neighbor relationship table further includes source media access control (MAC) addresses of the packets; and
   searching for the matching destination IP address within the first neighbor relationship table when the IP address contained in the information of the newly added port is taken as the source IP address comprises:
   finding a first neighbor relationship item having the IP address contained in the information of the newly added port as the source IP address and having a MAC address contained in the information of the newly added port as a source MAC address within the first neighbor relationship table, and taking a destination IP address recorded in the first neighbor relationship item as the matching destination IP address.

3. The method according to claim 1, wherein updating the flow tables stored in the virtual switching devices managed by the first controller comprises:
   obtaining a subnet identifier from a global port table according to the IP address and a MAC address contained in the information of the newly added port;
   searching for a matching source IP address within a second neighbor relationship table by using the IP address contained in the information of the newly added port and the subnet identifier; and
   sending flow tables relating to the matching source IP address to the virtual switching devices managed by the first controller;
   wherein the second neighbor relationship table includes destination IP addresses, subnet identifiers, and source IP addresses of the packets forwarded via the virtual switching devices managed by the controllers within the SDN.

4. The method according to claim 1, further comprising:
adding a first neighbor relationship item into the first neighbor relationship table when the first controller receives a first packet from a virtual switching device managed by the first controller, wherein the first neighbor relationship item records a corresponding relationship between a source IP address and a destination IP address of the first packet, and uses the source IP address of the first packet as an index of the first neighbor relationship item;
adding a second neighbor relationship item into a second neighbor relationship table, wherein the second neighbor relationship item records a corresponding relationship between the destination IP address and the source IP address of the first packet, and uses the destination IP address of the first packet as an index of the second neighbor relationship item; and
sending the first neighbor relationship item and the second neighbor relationship item to the second controller for synchronization.

5. The method according to claim 1, further comprising:
in response to a flow table deleting message sent from a virtual switching device managed by the first controller, deleting, by the first controller, from the first neighbor relationship table, a first neighbor relationship item corresponding to a source IP address and a source MAC address contained in the flow table deleting message;
obtaining a subnet identifier from a global port table according to a destination IP address contained in the flow table deleting message, and deleting, by the first controller, from a second neighbor relationship table, a second neighbor relationship item by using the destination IP address contained in the flow table deleting message and the subnet identifier;
in response to a port deleting message sent from the virtual switching device managed by the first controller, deleting, by the first controller, a first neighbor relationship item and a second neighbor relationship item matching to the port deleting message, and informing the virtual switching device to delete a flow table relating to a port contained in the port deleting message; and
sending, by the first controller, the port deleting message to the second controller, to enable the second controller to delete the first neighbor relationship item and the second neighbor relationship item matching to the port deleting message, and to enable the second controller to inform virtual switching devices managed by the second controller to delete flow tables relating to the port contained in the port deleting message.

6. The method according to claim 1, further comprising:
after receiving a second migration success message from a third controller, informing, by the first controller, virtual switching devices managed by the first controller to delete flow tables relating to an IP address contained in second information of a newly added port included in the second migration success message, in response to a determination that a source host of a second migrated virtual machine indicated in the second migration success message is managed by the first controller;
in response to a determination that the source host is not managed by the first controller, searching for a matching source IP address within a second neighbor relationship table by using the IP address contained in the second information of the newly added port as a destination IP address, wherein the second neighbor relationship table includes destination IP addresses and source IP addresses of the packets forwarded via the virtual switching devices managed by the controllers within the SDN; and
when the matching source IP address is found, determining whether a host identifier having a corresponding relationship with the matching source IP address in a global port table identifies a host managed by the first controller, and informing virtual switching devices managed by the first controller to modify ingress port numbers and tunnel IP addresses of the flow tables relating to the IP address contained in the second information of the newly added port into a port number and a tunnel IP address recorded in the second information of the newly added port, respectively, in response to a determination that the host identifier identifies the host managed by the first controller.

7. The method according to claim 6, wherein determining whether the host identifier having the corresponding relationship with the matching source IP address in the global port table identifies the host managed by the first controller comprises:
searching in the global port table for a subnet identifier according to the matching source IP address;
when a single subnet identifier is found, obtaining a host identifier corresponding to the matching source IP address and the single subnet identifier, and determining whether the host identifier obtained is identical with a host identifier of the host managed by the first controller; and
when multiple subnet identifiers are found, using the IP address and the MAC address contained in the second information of the newly added port to find a first subnet identifier identifying a first subnet from the global port table, determining second subnet identifiers identifying subnets capable of communicating with the first subnet, comparing the multiple subnet identifiers found and the second subnet identifiers to acquire a real subnet identifier for the matching source IP address, and determining whether the host identifier corresponding to the matching source IP address and the real subnet identifier within the global port table is identical with the host identifier of the host managed by the first controller.

8. A controller in a software defined network, comprising:
a processor;
a non-transitory machine readable storage medium; and
program units stored in the non-transitory machine readable storage medium and executable by the processor, the program units include:
a receiving unit, to receive information for a newly added port generated for a migrated virtual machine, and receive packets forwarded by virtual switching devices managed by the controller;
a generation unit, to generate a first neighbor relationship table according to source Internet protocol (IP) addresses and destination IP addresses of the packets;
a determination unit, to search for a matching destination IP address within the first neighbor relationship table by using an IP address contained in the information for the newly added port as a source IP address; and
a sending unit, to send flow tables relating to the matching destination IP address to a destination virtual switching device of the migrated virtual machine, update flow tables stored in the virtual switching devices managed by the controller, and send a migration success message including the information for the newly added port to a second controller, to enable the second controller to update flow tables stored in virtual switching devices managed by the second controller, such that flow forwarding is performed in accordance with the updated flow tables.

9. The controller according to claim 8, wherein the generation unit is to record corresponding relationships among the source IP addresses, source media access control (MAC) addresses, and the destination IP addresses of the packets in the first neighbor relationship table; and the determination unit is to search for a first neighbor relationship item having the IP address contained in the information for the newly added port as the source IP address and having a MAC address contained in the information for the newly added port as a source MAC address within the first neighbor relationship table, and take a destination IP address recorded in the first neighbor relationship item as the matching destination IP address.

10. The controller according to claim 8, wherein the generation unit is to record corresponding relationships among destination IP addresses, subnet identifiers, and source IP addresses of the packets in a second neighbor relationship table; and the determination unit is to obtain a subnet identifier from a global port table according to the IP address and a MAC address contained in the information for the newly added port, and search for a matching source IP address within the second neighbor relationship table by using the IP address contained in the information for the newly added port as the destination IP address and the subnet identifier obtained.

11. The controller according to claim 8, wherein the receiving unit is further to receive a second migration success message from a third controller;

the determination unit is further to determine whether a source host of a second migrated virtual machine indicated in the second migration success message is managed by the controller; and the sending unit is to inform virtual switching devices managed by the controller to delete flow tables relating to an IP address contained in second information for a newly added port included in the second migration success message, in response to a determination that the source host is managed by the controller; and the sending unit is further to trigger the determination unit to search for a matching source IP address within a second neighbor relationship table by using the IP address contained in the second information for the newly added port as a destination IP address in response to a determination that the source host is not managed by the controller, and inform virtual switching devices managed by the controller to modify ingress port numbers and tunnel IP addresses of the flow tables relating to the IP address contained in the second information for the newly added port into a port number and a tunnel IP address recorded in the second information for the newly added port, respectively, in response to a determination that a host identifier corresponding to the matching source IP address in the global port table identifies a host managed by the controller.

12. The controller according to claim 8, wherein the generation unit is to:

add a first neighbor relationship item into the first neighbor relationship table when the receiving unit receives a first packet from a virtual switching device managed by the controller, wherein the first neighbor relationship item records a corresponding relationship between a source IP address and a destination IP address of the first packet, and uses the source IP address of the first packet as an index of the first neighbor relationship item;

add a second neighbor relationship item into a second neighbor relationship table, wherein the second neighbor relationship item records a corresponding relationship between the destination IP address and the source IP address of the first packet received by the receiving unit, and uses the destination IP address of the first packet as an index of the second neighbor relationship item; and instruct the sending unit to send the first neighbor relationship item and the second neighbor relationship item to the second controller for synchronization.

13. A non-transitory computer readable storage medium storing programs configured to be executed by a controller, the programs comprising instructions to:

receive information for a newly added port generated for a migrated virtual machine, and search for a matching destination Internet protocol (IP) address within a first neighbor relationship table by using an IP address contained in the information for the newly added port as a source IP address;

send flow tables relating to the matching destination IP address to a destination virtual switching device of the migrated virtual machine, and update flow tables stored in virtual switching devices managed by the controller;

send a migration success message including the information for the newly added port to a second controller, to enable the second controller to update flow tables stored in virtual switching devices managed by the second controller;

wherein the first neighbor relationship table includes source IP addresses and destination IP addresses of packets forwarded via virtual switching devices managed by controllers within a software defined network (SDN); and prohibit storage of one or more copies of the updated flow tables at the first and second controllers.

14. The non-transitory computer readable storage medium according to claim 13, wherein the programs further comprise instructions to:

after receiving a second migration success message from a third controller, inform virtual switching devices managed by the controller to delete flow tables relating to an IP address contained in second information for a newly added port included in the second migration success message, in response to a determination that a source host of a second migrated virtual machine indicated in the second migration success message is managed by the controller;

in response to a determination that the source host is not managed by the controller, search for a matching source IP address within a second neighbor relationship table by using the IP address contained in the second information for the newly added port as a destination IP address, wherein the second neighbor relationship table includes destination IP addresses and source IP addresses of the packets forwarded via the virtual switching devices managed by the controllers within the SDN; and when the matching source IP address is found, determine whether a host identifier having a corresponding relationship with the matching source IP address in a global port table identifies a host managed by the controller, and inform virtual switching devices managed by the controller to modify ingress port numbers and tunnel IP addresses of the flow tables relating to the IP address contained in the second information for the newly added port into a port number and a tunnel IP address recorded in the second information for the newly added port, respectively, in response to a determination that the host identifier identifies a host managed by the controller.

15. The non-transitory computer readable storage medium according to claim 13, wherein the programs further comprise instructions to:

add a first neighbor relationship item into the first neighbor relationship table when the controller receives a first packet from a virtual switching device managed by the controller, wherein the first neighbor relationship item records a corresponding relationship between a source IP address and a destination IP address of the first packet, and uses the source IP address of the first packet as an index of the first neighbor relationship item;

add a second neighbor relationship item into a second neighbor relationship table, wherein the second neighbor relationship item records a corresponding relationship between the destination IP address and the source IP address of the first packet, and uses the destination IP address of the first packet as an index of the second neighbor relationship item; and send the first neighbor relationship item and the second neighbor relationship item to the second controller for synchronization.

\* \* \* \* \*